United States Patent [19]

Smith

[11] 4,158,769

[45] Jun. 19, 1979

[54] DETERMINATION OF URANIUM CONTENT IN MATERIAL

[75] Inventor: Richard C. Smith, O'Hara Township, Allegheny County, Pa.

[73] Assignee: Westinghouse Electric Corp., Pittsburgh, Pa.

[21] Appl. No.: 843,770

[22] Filed: Oct. 20, 1977

[51] Int. Cl.² .................. G01V 5/00; G01N 21/24; G21K 3/00

[52] U.S. Cl. .................. 250/255; 250/435; 250/510

[58] Field of Search .............. 250/255, 435, 253, 339

[56] References Cited

U.S. PATENT DOCUMENTS

| | | | |
|---|---|---|---|
| 3,002,091 | 9/1961 | Armstrong | 250/255 |
| 3,158,741 | 11/1964 | Skvarla | 250/254 |
| 3,825,751 | 7/1974 | Johnson, Jr. et al. | 250/253 |
| 3,849,655 | 11/1974 | Martucci | 250/366 |
| 3,988,615 | 10/1976 | Umbarger et al. | 250/253 |
| 4,006,358 | 2/1977 | Howarth | 250/339 |
| 4,055,764 | 10/1977 | Dimeff | 250/343 |

Primary Examiner—Alfred E. Smith
Assistant Examiner—Janice A. Howell
Attorney, Agent, or Firm—L. A. DePaul; Z. L. Dermer

[57] ABSTRACT

The content of uranium, in a solution, as extracted from uranium ore by a solution mining technique for example, is determined by measuring the intensity of selected gamma or X radiation emitted by the solution. The gamma or X radiation is preferably derived from the thorium-234 daughter of uranium 238. The radiation from the solution impinges on a scintillator after being passed successively through K-edge filter foils of an alloy of ytterbium (e.g. with tin), an alloy of lutecium (e.g. with tin), and an alloy of hafnium (e.g. with zirconium). The resulting scintillation counts of the scintillator with the filter foils are arithmetically processed so that the scintillation derived from the thorium-234 63 KeV line is isolated. This scintillation is evaluated as a measure of the uranium content. To assure that the uranium thorium conversion has reached a stable state, the measurement should be made about three months after the uranium solution is produced.

9 Claims, 6 Drawing Figures

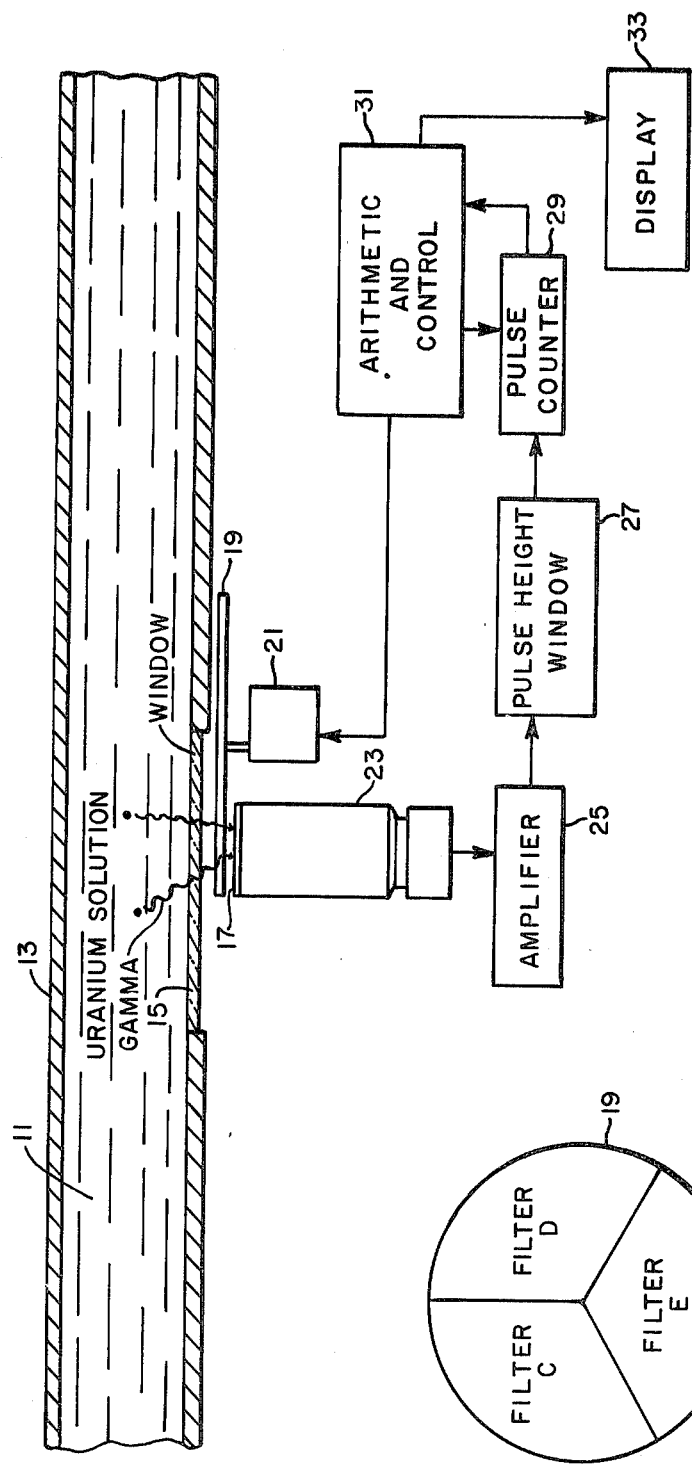

DETERMINATION OF URANIUM CONTENT IN MATERIAL

BACKGROUND OF THE INVENTION

This invention relates to the determination of the quantity of a component in material and has particular relationship to the determination of the quantity of uranium in material. In the interest of facilitating the understanding of this invention, this application deals predominately with the determination of the quantity of uranium in a uranium solution. To the extent this invention is applicable to quantity determinations of other types such determinations are regarded as within the scope of this invention.

There is being developed a solution mining technique for extracting uranium directly from ore without removing the ore from the ground. This technique obviates the need for tunneling and/or excavation and thus has low operating and land reclamation costs. Typically, in this process an inexpensive, innocuous solvent is pumped into the ground through wells that penetrate the ore body. The solution dissolves and removes the compounds of uranium as it is drawn through the porous ore, which is typically sandstone, by pumps at the heads of other wells that pass through the ore body. The uranium-bearing solution is processed at a plant using ion exchange techniques. The usual ore handling and crushing steps are thereby circumvented. It is contemplated that the uranium solutions will typically contain concentrations from 10 to 1000 ppm (parts per million) and will flow at rates from 10 to 300 gal/min. It is anticipated that a processing plant will simultaneously handle solution from more than one well or group of wells and a monitoring system is needed for each input to record the rate and total quantity of uranium delivered. This information serves (i) to monitor the performance of the wells, (ii) to determine the royalty payment due each well owner, and (iii) to adjust the processes at the extraction plant. So that the data derived by the monitoring will serve these purposes, it is necessary that the separate uranium-solution flow lines be monitored separately with samples periodically drawn from the solutions during operation. There may be as many as 20 of such flow lines in one installation.

It is an object of this invention to provide apparatus for, and a method of, detecting the quantity of uranium in the solutions. This method and apparatus measures the concentration of uranium in solution, which together with the solution's flow rate, specifies the total quantity of uranium transported.

In accordance with the teachings of the prior art, the quantity of uranium is monitored by periodic chemical analysis of samples of the solution. This procedure is costly and cumbersome. In addition, the analysis may not lead to accurate and reliable results particularly, as may happen often, the composition of the solutions varies widely so that the chemical analysis does not yield a reliable representation of the uranium content of the solutions.

It is an object of this invention to overcome the disadvantages and drawbacks of the prior art and to provide a method and apparatus for reliably and accurately monitoring the uranium content of solutions and, more generally, such content of any material. It is also an object of this invention to provide such a method and apparatus which shall lend itself to continuous monitoring of material to measure its content of uranium.

SUMMARY OF THE INVENTION

It has been realized that the objects of this invention can be met by gamma-ray spectroscopy. The expression, "gamma ray" or "gamma radiation" as used in this application includes within its scope X-rays. Precisely defined, gamma rays are emitted by reason of events in the nucleus of an atom while X-rays are emitted by reason of events in the planetary rings of electrons surrounding the nucleus. For brevity the expression, "gamma rays" or "gamma radiation" as used herein is to be taken to refer both to nuclear emissions and planetary emissions. Among its other advantages, gamma radiation is highly penetrable so that the detector for the radiation or other parts of the measuring apparatus may be placed outside of the conductor or other container of the uranium solution. In this way fouling, corrosion or abrasion of any and all parts of the measuring apparatus may be precluded.

The gamma radiation which serves to determine the quantity of uranium is emitted by its daughters. In the practice of this invention, the intensity or the strength of the particular line or lines of the uranium spectrum whose strength is proportional to the uranium concentration are used for measurement or determination of the quantity of uranium. Problems arising from the unknown and usually variable ratio between uranium and its daughters are thus avoided. Among the gamma-ray lines which meet the proportionality condition are the lines at 63 KeV (thousand electron volts) and at 93 KeV. These lines are generated by thorium-234. Thorium-234 is derived from uranium 238 on emission by uranium 238 of an alpha particle. $U^{238}$ has a half-life of $4.498 \times 10^9$ years while $Th^{234}$ has a half life of 24.1 days. The 63 KeV line is preferred since it is more remote from other interfering energy lines than the 93 KeV line. Such interfering lines are lead-214 at 53 KeV, and the bismuth, polonium and radon lines at 79 KeV, 81 KeV and 86 KeV respectively. Background radiation, continuous in energy, is derived from Compton interaction of high-energy gamma radiation typical of sources including radium 226.

The detection and measurement of the gamma radiation presents problems and it is an object of this invention to provide a reliable low-cost method for detecting such radiation and apparatus for practicing such method.

Ge (Li), (lithium drifted germanium) detectors are available. Such detectors have acceptable spectral energy-line resolution but are of high cost and require liquid-nitrogen cooling continuously. NaI(Tl) (thallium activated sodium iodide) scintillation detectors are of low cost but have unacceptably poor resolution. Mercuric oxide detectors are in course of development and their acceptability is not known.

In accordance with this invention the gamma radiation from the material under observation is filtered in turn by filtering means including several K-edge filter foils comprising a differential set. The resulting filtered radiation is impinged on a detector, typically a NaI(Tl) scintillator. An advantage of the 63 KeV line is that filter materials with appropriate K-edge energies are readily available for it. The signals derived from the detector are optimized by the filtering so as to isolate, for measurement only, the radiation of the selected spectral line, which as stated is preferably the 63 KeV line, to the exclusion of spectral lines of other energies and for more or less uniform background radiation. In accordance with this invention the unacceptable resolution of the NaI(Tl) scintillator is corrected by the differential filter and the resolution of the overall detector is sufficiently improved to achieve a high signal rate.

A differential filter for gamma rays is described in *The Encyclopedia of X-Rays and Gamma Rays*, George L. Clark, page 390, Publisher Reinhold, New York, 1963.

A K-edge filter transmits incident X-rays or gamma rays to an extent dependent on the wavelength (energy) of the radiation. The feature of the K-edge filter which is of interest in this invention is the occurrence of a sharp drop in its transmission at a specific wavelength of the radiation. This drop is called the K-edge discontinuity and represents the minimum energy needed to eject an electron from the K-shell of the filter atoms. Starting at low energy, X-rays of increasingly high energies (shorter wavelengths) are transmitted more and more readily until the energy or wavelength of the discontinuity is reached. At this point, the transmission drops by about a factor of 10 or more. From this magnitude, the transmission again increases with increasing X-ray energy. Because each elemental substance has a unique atomic structure, the energy required to remove a K-shell electron is different for each element. As the atomic number increases, so does this energy. Consequently, the gamma ray energy which falls on the K-absorption edge increases when a filter is changed to one of a higher atomic number. Quantitatively, the coefficient $\mu$ characterizes the capability of a material to absorb gamma rays. If x is the distance a gamma ray beam traverses when passing through a filter, the intensity number of counts; e.g. detected scintillations, of the gamma ray spectral line is attenuated by a factor $\exp(-\mu x)$, where $\mu$ is the gamma attenuation coefficient and x the thickness of the filter foil. The magnitude of $\mu$ changes with energy and is, in fact, the quantity which increases roughly tenfold at the K-edge energy.

In accordance with this invention the radiation from the material under observation is transmitted, in turn, through one and then the other of a pair of K-edge filter foils whose K-absorption edges bracket in a narrow band the energy or wavelength line to be isolated. The thickness of the filter foils are selected so that, outside of the band, each foil of the pair has the same transmission characteristics as the other of the pair. The gamma radiation from the material under observation is transmitted to the scintillator in sequence first through one filter and then through the other and the difference in count rate of scintillations for the two filter foils is determined. This difference is proportional to the strength of the gamma line of the selected wavelength plus the background within the band. Where the background is relatively small, this count signal may be processed to determine the uranium content of the material. However, more precise measurement is achieved by suppressing the background. A second set of filter foils, whose K-absorption edges bracket a second band adjacent to the above-described band, serves to suppress the background. One member of this second set of foils may be one of the foils used in the first set. This second set includes a pair of foils whose transmission characteristics outside the second band are the same. The radiation from the material is transmitted to the scintillator through the second set of filter foils in sequence and the scintillator counts for one filter foil is subtracted from the scintillator counts for the other. The background signal is subtracted from the signal obtained with the first pair of filters. The resulting data or signal is proportional to the strength of the selected line alone, with the background suppressed. It is preferred that the measurements be made about two to four months after the solution is formed to assure stability of the solution as to the $Th^{234}$ daughter of uranium.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIG. 2 is a diagrammatic view showing apparatus in accordance with this invention for practicing the method of this invention;

FIG. 3 is a plan view of a K-edge filter disc used in the practice of this invention;

DETAILED DESCRIPTION OF INVENTION

Figure 1:
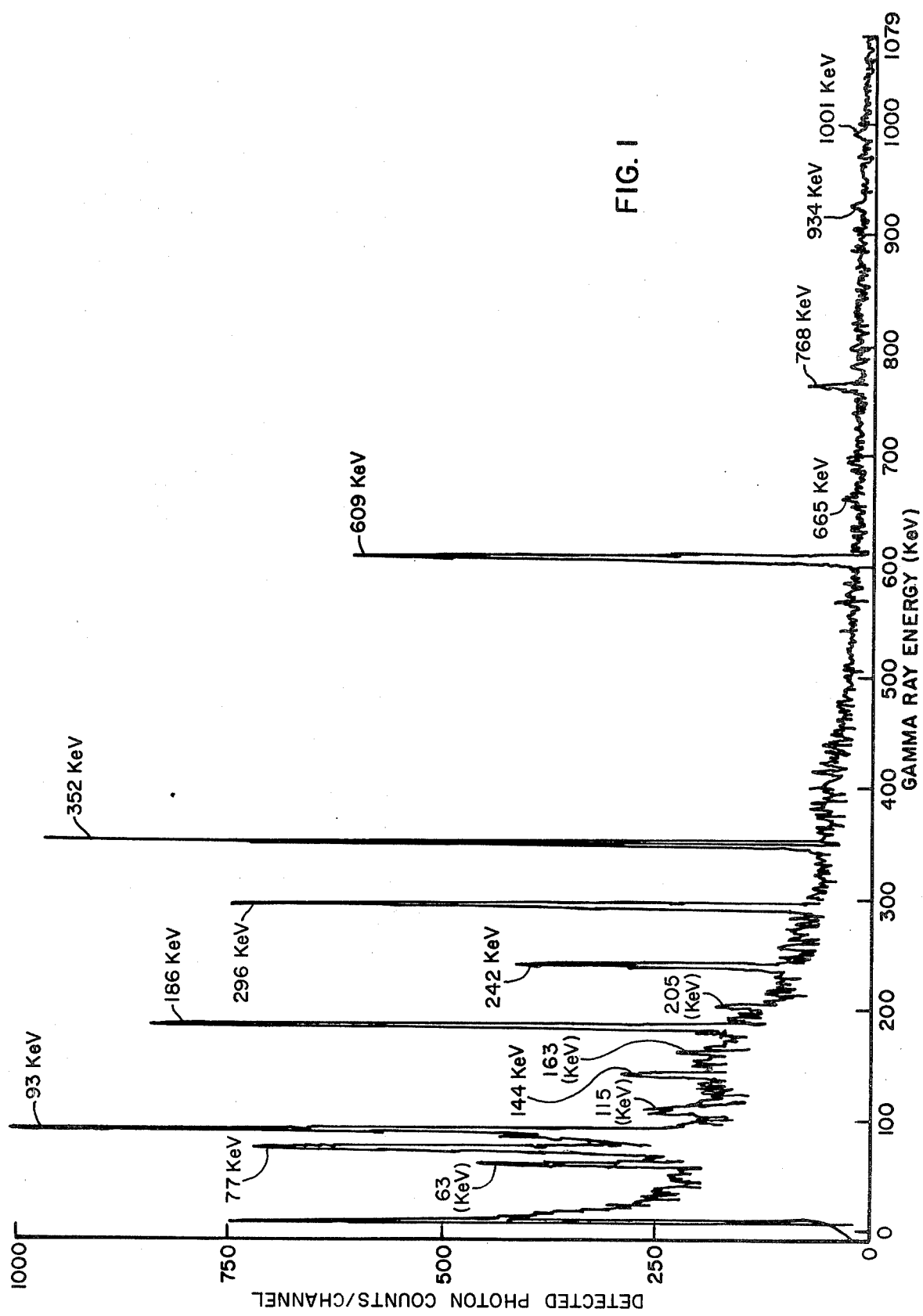
FIG. 1 is a graph showing the spectrum of radiation from material containing uranium and radium (2U to 1Ra by activity) as measured with a high resolution Ge (Li) detector.
Figure 1A:
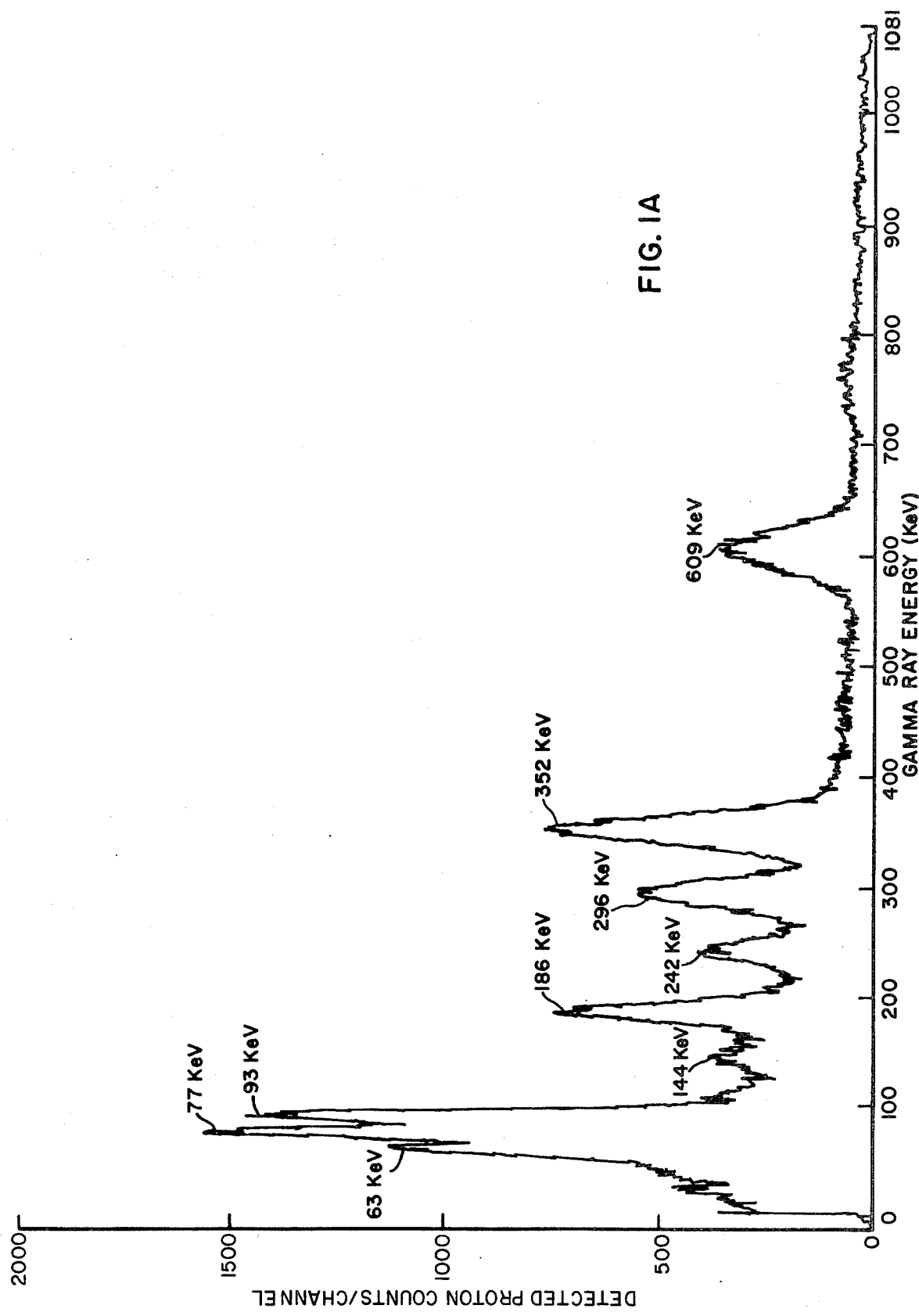
FIG. 1A is a graph showing the spectrums of radiation from the same material as measured with a sodium iodide (Tl) crystal detector.

In FIG. 1 the graph is an energy spectrum of uranium derived from radioactive material including 2400 pico curies of uranium in 1230 pico curies of radium in 25 grams of calcite powder. The spectrum was plotted with a gamma-ray spectrum analyzer with a multi-channel pulse height analyzer having 1024 channels. The detector has a Ge(Li) detector of 54.4 cubic centimeters volume surrounded by the material on all faces except the bottom. The counting time was 500 seconds. In FIG. 1 intensity or strength or magnitude is plotted vertically in counts and energy, which corresponds to wavelength, is plotted horizontally in KeV. The graph shows prominent lines at 63 KeV and 93 KeV for Thorium-234. FIG. 1A shows the form of the corresponding curve which has been derived from the same radioactive material with a NaI(Tl) scintillator. The gamma ray spectrum was plotted with the same multi-channel analyzer. The detector was a cylindrical NaI(Tl) scintillator 3 inches in diameter and 3 inches long. The counting time was 350 seconds. As indicated, the numbers above the gamma lines in FIGS. 1 and 1A give the energy of the gamma lines; i.e., the h$\nu$ where h is Planck's constant and $\nu$ is the frequency.

FIGS. 2 and 3 show apparatus according to this invention for a uranium solution 11 transmitted through a channel 13 having a window 15 through which gamma rays are transmitted. This apparatus includes a scintillator 17 typically and NaI(Tl) crystal. Preferably the crystal 17 should have a large area to increase the signal rate (and therefore the accuracy). The crystal should also have a small thickness to reduce the count rate from high-energy radiation from radium and its daughters. A filter 19 is interposed between the window 15 and the crystal 17. This filter 19 isolates the gamma radiation which passes through window 11 to selected bands of the spectrum of thorium-234. Typically, these bands may be about the 63 KeV line or the 93 KeV line with the former preferred.

The filter 19 is a disc having a plurality of filter foils C, D and E. Filter foils C, D and E have like gamma ray transmission characteristics except that the K-edge discontinuity of foil D is displaced in the direction of increased energy with respect to foil C and the K-edge discontinuity of foil E is similarly displaced with respect to D. Typically, for the 63 KeV line foil C may be composed of ytterbium+4.2% tin, disc D of lutecium+3.6% tin and disc E of hafnium+3.0% zirconium. Hafnium in its available state normally includes 3.0% zirconium. The pertinent data on these filter foils is shown in Table I.

Table I

| Filter | Filter Data | |
|---|---|---|
| | K-edge (keV) | Thickness (g/cm$^2$) |
| Ytterbrium + 4.2% Tin | 61.3 | 0.171 |
| Lutecium + 3.6% Tin | 63.3 | 0.164 |
| Hafnium + 3.0% Zirconium | 65.3 | 0.159 |

Table I shows specific quantities of tin to be added to the ytterbium and lutecium so as to set the ratio of maximum and minimum magnitudes of $\mu$ at the K-edge. The ratio must be the same for each filter foil. The additions are adjusted to meet the $\mu$ of the hafnium-zirconium. The magnitudes of $\mu x$ for the three filter foils are equalized by adjusting the thickness of the foils so that their transmission characteristics except at the discontinuities are the same. The radiation should be impinged on the foils at right angles to their surface. Impingement of radiation at an angle should be minimized to avoid scattering. If this is not practical, the foil thicknesses may be reduced so that the average path lengths of the gamma rays through the foils will be the thickness values given in the foregoing table. The table assumes perpendicular impingement of the gamma rays on the foils. Where the impingement is not perpendicular the average path length is longer than the perpendicular distance.

Figure 4:
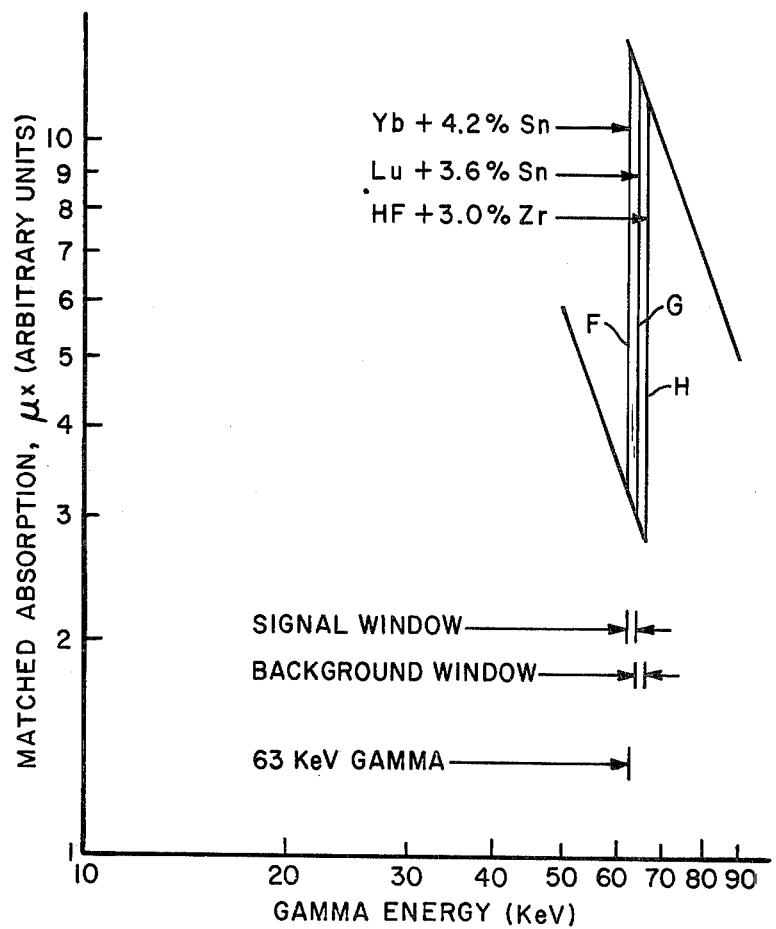
FIG. 4 is a graph showing the transmission characteristics of the K-edge filter foils used in the practice of this invention.

FIG. 4 shows the characteristics of the three filter foils near their K-edge discontinuities. The absorption in $\mu x$ is plotted vertically and the gamma energy horizontally (in the exponential function, $\mu x$ is given a negative sign). On the left $\mu x$ for the three filter foils C, D and E decreases so that the transmission increases. At 61.3 keV the absorption $\mu x$ for Yb+4.2% Sn, filter foil C, increases sharply, as represented by line F, so that transmission at this energy decreases. Likewise at 63.3 keV the $\mu x$ for Lu+3.6% Sn, filter foil D, increases sharply, as represented by line G, and at 63.3 keV the $\mu x$ for Hf+3.0% Zr, filter foil E, increases, as represented by line H. Between lines F and G, the $\mu x$ for filter foils D and E is low so that they transmit gamma rays in this band, and between lines G and H the $\mu x$ for filter foil E is low so that it transmits gamma rays in this band. The widths of the bands between F and G and G and H are about 2 keV. On the right, as on the far left, $\mu x$ values for the three filter foils C, D and E are matched and decrease at the same rate as a function of energy (keV); the transmissions increase as the same rate for each foil.

The filter disc 19 is rotated by an indexer 21 so that the gamma rays from window 15 are filtered sequentially first by filter foil C, then by filter foil D, then by filter foil E.

The gamma rays of selected energy produce scintillation in scintillator 17. The apparatus includes a phototube 23, essentially a photomultiplier. The output of the phototube 23, which is in the form of pulses, is impressed as input on amplifier 25. Pulses of higher voltage correspond to higher energy (keV) detected gammas in general, although the correlation is far from exact due to the poor resolution of such an apparatus. The output of amplifier 25 is passed through a standard, electronic, single channel pulse-height analyzer 27. This analyzer 27 transmits pulses only within a specified range of voltage (a window). The window is set so that it is as narrow as practicable and yet transmits all pulses of the selected line (63 keV). The window of the pulse-height analyzer 27 should be sufficiently narrow so that the background count rate is low, but not so narrow that any expected drift such as due to temperature would shift the 63 keV line out of the window. Typically the width of the window is 25 to 50 keV.

The output of the pulse-height analyzer 27 is transmitted through a pulse counter 29. The output of the counter 29 is impressed on an electronic arithmetic and control unit 31. This unit 31 computes the differences between the output count rate of the scintillator 17 with the input radiation filtered sequentially by filter foils C, D and E and also the difference between these differences. The resulting output of the arithmetic and control unit 31 is supplied to a display 33 or other device for making readable the strength of this output. In addition, this unit 31 controls indexer 21 to synchronize the indexing of the filter foils C, D and E with its computations. For a similar purpose unit 31 controls the pulse counter.

Figure 5:
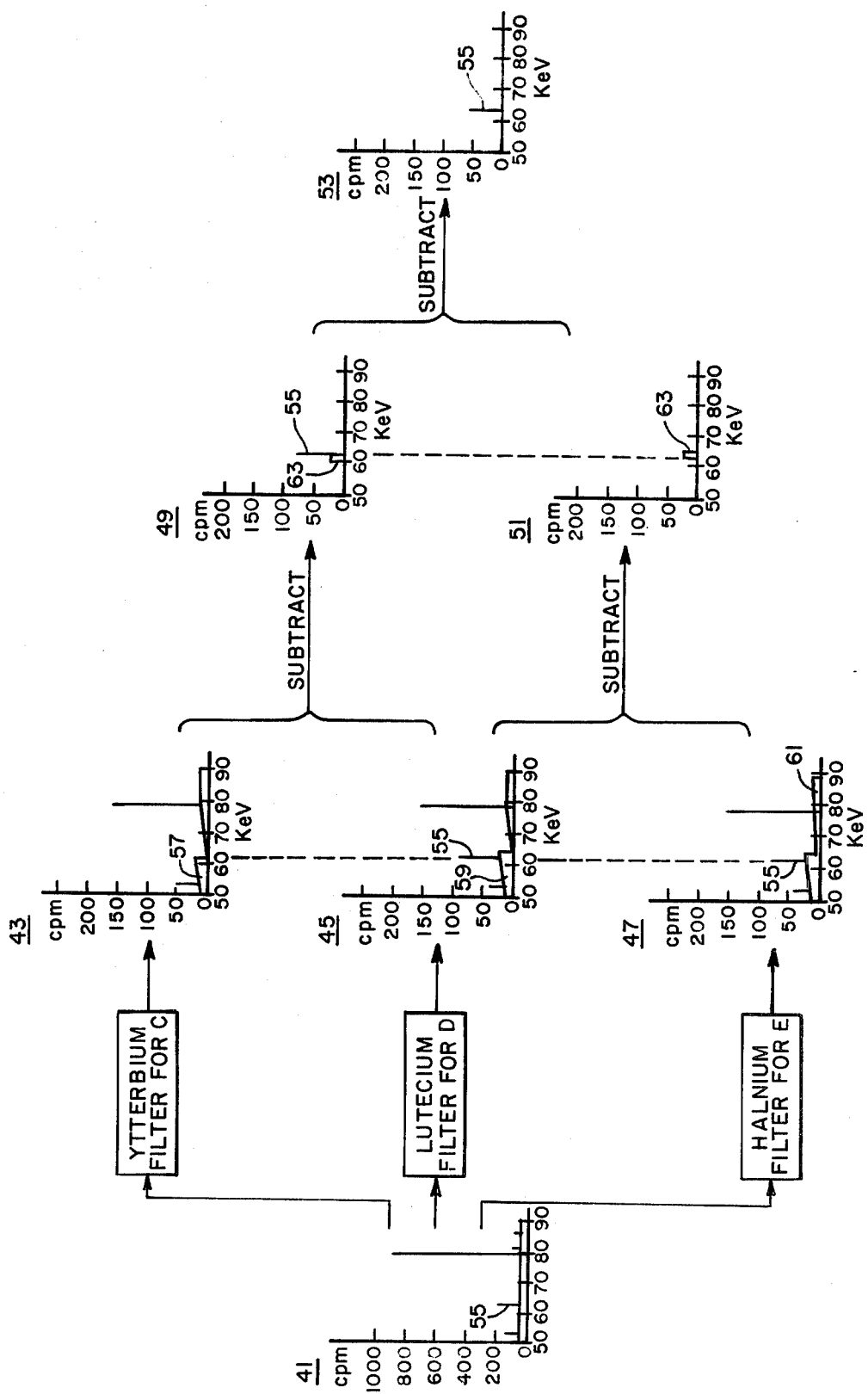
FIG. 5 is a diagram showing the manner in which a selected line of the uranium spectrum is isolated in the practice of this invention.

FIG. 5 shows the operation of the apparatus shown in FIGS. 2 and 3. This figure includes graphs 41, 43, 45, 47, 49, 51, 53. In each graph scintillation counts per minute is plotted vertically and energy, horizontally. These graphs were derived for 100 ppm solution (uranyl nitrate) analyzed with apparatus, according to this invention, including the filter foils C, D, E, shown in Table I and a circular scintillator 17 of NaI(T1) 1 millimeter thick having a diameter of 3 inches. Higher count rates can be achieved with thinner filters C, D, and E. The intensity ratios in Graphs 41 through 53 correspond to equilibrium concentration of the daughter product Thorium-234 of uranium; the background was set arbitrarily. The different effects of the three filter foils C, D, and E on the background and on the 63 keV line are indicated in the FIG. 5. For each filter foil, the effect on the other lines is identical. As shown, the pulse height window is set between 50 and 90 keV.* The pulse counter 29 counts the integral of each of these filtered spectra. Consequently, the plots of the filtered spectra show the contribution of each energy to a given total count. When the indicated subtractions are made, a pure 63 keV signal, which is proportional to the uranium content, is obtained.

* Strictly speaking, the boundaries are shown here with respect to the pulse height, not energy. The boundaries with respect to energy are actually fuzzy as a result of the finite resolution of the NaI(T1) detector.

Graph 41 shows the overall spectrum including the 63 keV line 55. Graph 43 shows the spectrum as filtered by foil C. This spectrum is reduced overall from that of graph 41 (note the change in vertical scale). Also its character has been altered, mainly in that line 55 is suppressed and the background 57 is modified. Graphs 45 and 47 show the spectrums as filtered by foils D and E respectively. Except in the neighborhood of the K-edges of the foils, graphs 43, 45, and 47 are identical. In graphs 45 and 47 only the background 59, 61 is extensively suppressed. Compared to graph 43, graphs 45 and 47 show the 63 keV line 55 as unsuppressed. Graph 49 shows the difference between the radiation filtered by foil C and the radiation filtered by foil D. Only line 55 and the background 63 remain. Graph 51 shows the difference between radiation filtered by foil D and by foil E. Only the background 63 remains. Graph 53 shows the difference between the differences shown in graphs 49 and 51. Only line 55 remains. The magnitude of this line is a measure of the uranium content.

While a preferred embodiment of this invention has been disclosed herein, many modifications thereof are feasible. This invention is not to be restricted except insofar as is necessitated by the spirit of the prior art.

I claim:

1. The method of determining the quantity of uranium in a material with apparatus including K-edge filtering means and radiometric means, the said method comprising, transmitting through said K-edge filtering means the radioactive radiation from said material to derive from said filtering means resulting radiation substantially only radiation of a selected energy line of the spectrum of the radioactive radiation of said material, and subjecting said radiometric means to said resulting radiation, measuring the magnitude of said resulting radiation to measure said quantity of uranium.

2. The method of claim 1 practiced with apparatus wherein the filtering means includes first, second and third K-edge filter foils, the said method comprising transmitting the radioactive radiation through said first K-edge filter foil, transmitting said radioactive radiation through said second K-edge filter foil, the said first and second K-edge filter foils having like transmission characteristics except at discontinuities corresponding to energies which differ by a small magnitude such that the said discontinuities define a narrow band of energies about the selected line of the spectrum of the radiation from said material with the discontinuity of said first filter foil on the lower-energy side of said selected line and the discontinuity of said second filter foil on the higher energy side of said selected line, impinging the resulting radiation transmitted by said first and second filter foils each on the radiometric means to derive a first difference signal between the resulting radiation transmitted by said first filter foil and by said second filter foil, said first difference signal including substantially only said selected line, and background, transmitting said radioactive radiation through said third K-edge filter foils, the said second and third K-edge filter having the transmission characteristics except for discontinuities defining a narrow band of energies with the discontinuity of said third filter foil on the higher-energy side of the discontinuity of said second filter foil transmitting the resulting radiation each transmitted by said second and third filter foil to said radiometric means to derive a second difference signal between the resulting radiation transmitted by said second filter foil and the resulting radiation transmitted by said third filter foil, deriving a third difference signal between said first difference signal and said second difference signal, said third difference signal including substantially only said line, said radiometric means measuring the magnitude of said third difference signal as a measure of said quantity of uranium.

3. The method of claim 1 practiced with apparatus wherein the filtering means includes a first K-edge filter foil and a second K-edge filter foil, the said method comprising transmitting the radioactive radiation through said first K-edge filter foil, transmitting said radioactive radiation through said second K-edge filter foil, said first and second K-edge filter foils having like transmission characteristics discontinuities corresponding to energies of the spectrum of said radioactive radiation which differ by a small magnitude such that the said discontinuities define a narrow band of energies of about the selected line of said spectrum with the discontinuity of said first filter foil on the lower energy side of said selected line and the discontinuity of said second filter foil on the higher energy side of said line, impinging the resulting radioactive radiation by said first and second filter foils each on the radiometric means to derive a difference signal between the resulting radiation transmitted by said first filter foil and the resulting radiation transmitted by said second filter foil, and measuring the magnitude of said difference signal as a means of said quantity of uranium.

4. The method of claim 1 practiced to measure the content of uranium in a solution wherein the solution is aged at least between two and four months after it is produced and the determination is made after the aging.

5. Apparatus for determining the quantity of uranium in a material comprising means, responsive to the gamma radiation emitted by said uranium, for producing a signal dependent on the magnitude of said gamma radiation, K-edge filter means interposed between said material and said signal producing means for confining the resulting gamma radiation transmitted to said signal producing means predominately to radiation corresponding to a selected energy line of the spectrum of the radiation from said material, and means for determining the intensity of the signal produced by said signal producing means as a measure of said uranium.

6. The apparatus of claim 5 wherein the K-edge filter means includes a plurality of K-edge filter foils said filter foils having closely spaced discontinuities, but otherwise having like transmission characteristics one of said filter foils having a discontinuity on the lower-energy side of a selected energy line of the radiation spectrum of said uranium, another of said filter foils having a discontinuity on the higher-energy side of said selected energy line and a third of said filter foils having a discontinuity on the higher energy side of the discontinuity of said second filter foil, the said apparatus also including means, connected to said filter foils for interposing said filter foils sequentially between the material and the signal-producing means to intercept the radiation from said material to which said signal-producing means is subject, means responsive to the signal-producing means including computer means for deriving a first difference signal between the signal produced by said signal-producing means when said one and other filter foils respectively intercept said radiation, for deriving a second difference signal between the signals produced by said signal-producing means when said other and third filter foils intercept said radiation, and for producing a third difference signal between said first and second difference signal, and means connected to said computer means, for determining the magnitude of said third difference signal to determine said quantity of uranium.

7. The apparatus of claim 5 wherein the K-edge filter means includes a plurality of K-edge filter foils said filter foils having closely spaced discontinuities, but otherwise having like transmission characteristics one of said filter foils having a discontinuity on the lower-energy side of a selected energy line of the radiation spectrum of said uranium, and another of said filter foils having a discontinuity on the higher-energy side of said selected energy line, means connected to said filter foils for interposing said filter foils sequentially between the material and the signal-producing means to intercept the radiation from said material to which said signal-producing means is subject, means responsive to the signal-producing means including computer means for deriving a difference signal between the signals produced by said signal-producing means when said one and other filter foils respectively intercept said radiation, and means connected to said computer means, for determining the magnitude of said difference signal to determine said quantity of uranium.

8. The apparatus of claim 7 wherein the signal-producing means is a scintillator, which produces scintillations dependent in magnitude on the energy of the radiation impinging thereon, and the means responsive to the signal-producing means includes photo-sensitive means responsive to the signals produced by said scintillator and arithmetic means for processing the output of said scintillator.

9. The apparatus of claim 7 wherein the scintillator is a sodium iodide crystal, the first foil is composed of ytterbium+about 4.2% tin, the second filter foil of lutecium+about 3.6% tin and the third filter foil of hafnium+about 3.0% zirconium and the selected line is at an energy of 63000 electron volts.

* * * * *